(12) United States Patent
Forgrave

(10) Patent No.: US 12,384,486 B2
(45) Date of Patent: Aug. 12, 2025

(54) QUICK RELEASE PEDAL

(71) Applicant: Robert O. Forgrave, Kirkland, WA (US)

(72) Inventor: Robert O. Forgrave, Kirkland, WA (US)

(73) Assignee: Robert Forgrave, Kirkland, WA (US)

( * ) Notice: Subject to any disclaimer, the term of this patent is extended or adjusted under 35 U.S.C. 154(b) by 0 days.

(21) Appl. No.: 18/733,825

(22) Filed: Jun. 4, 2024

(65) Prior Publication Data

US 2024/0400155 A1 Dec. 5, 2024

Related U.S. Application Data

(60) Provisional application No. 63/506,315, filed on Jun. 5, 2023.

(51) Int. Cl.
*B62M 3/08* (2006.01)

(52) U.S. Cl.
CPC ..................... *B62M 3/08* (2013.01)

(58) Field of Classification Search
CPC ............................. B62M 3/08; B62K 2206/00
USPC ....................................................... 74/594.7
See application file for complete search history.

(56) References Cited

U.S. PATENT DOCUMENTS

| | | | | |
|---|---|---|---|---|
| 1,276,139 | A * | 8/1918 | Warren | B62M 3/08 74/594.7 |
| 6,874,387 | B2 * | 4/2005 | Vaughn | B62K 15/00 403/325 |
| 7,228,761 | B1 * | 6/2007 | Chen | B62K 15/006 74/594.7 |
| 8,671,799 | B2 * | 3/2014 | Chen | G05G 5/065 403/321 |
| 11,661,136 | B1 * | 5/2023 | Lin | B62M 3/08 74/594.7 |

FOREIGN PATENT DOCUMENTS

| | | | | |
|---|---|---|---|---|
| JP | 06239282 | A * | 8/1994 | |
| KR | 20130066180 | A * | 6/2013 | B62M 3/08 |
| TW | 201540601 | A * | 11/2015 | |
| WO | WO-02100711 | A1 * | 12/2002 | B62K 15/008 |

OTHER PUBLICATIONS

Translation of TW-201540601-A, Liang, Nov. 1, 2015 (Year: 2015).*
Translation of JP 06239282A, Sugino, Aug. 30, 1994 (Year: 1994).*
Translation of WO 02100711 A1, Sato, Dec. 19, 2002 (Year: 2002).*
Translation of KR 20130066180A, Jun. 20, 2013 (Year: 2013).*

\* cited by examiner

*Primary Examiner* — Daniel D Yabut

(57) ABSTRACT

A quick release bicycle pedal assembly including a bicycle pedal and a pedal spindle rotatably securable to a bicycle pedal. The pedal spindle has a circumscribed groove disposed toward a shaft first end and a shaft threaded end opposite the shaft first end, wherein the shaft threaded end is securable to the pedal bearing and allows the pedal to spin around the pedal spindle when the shaft threaded end is secured to the pedal bearing. The quick release bicycle pedal assembly includes a pedal adapter including a latch body having male adapter threads disposed on a first body latch end for securing the pedal adapter to a bicycle crank arm, an opening extending through the latch body, the opening aligned axially with the male adapter threads, a first lever disposed pivotally on the latch body and a second lever disposed pivotally on the latch body.

18 Claims, 5 Drawing Sheets

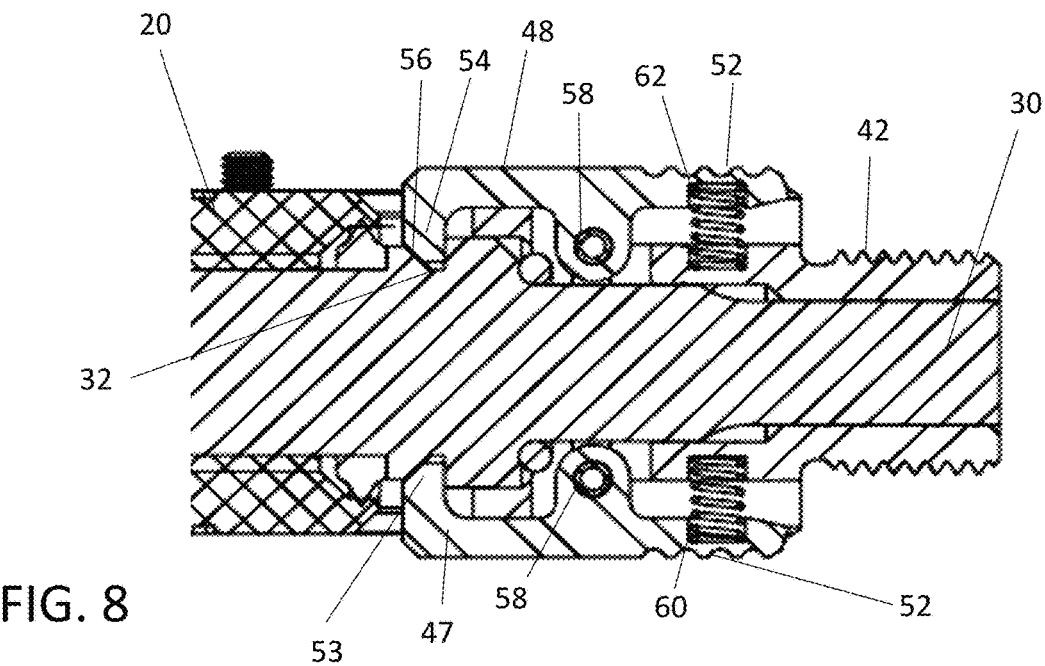
FIG. 8
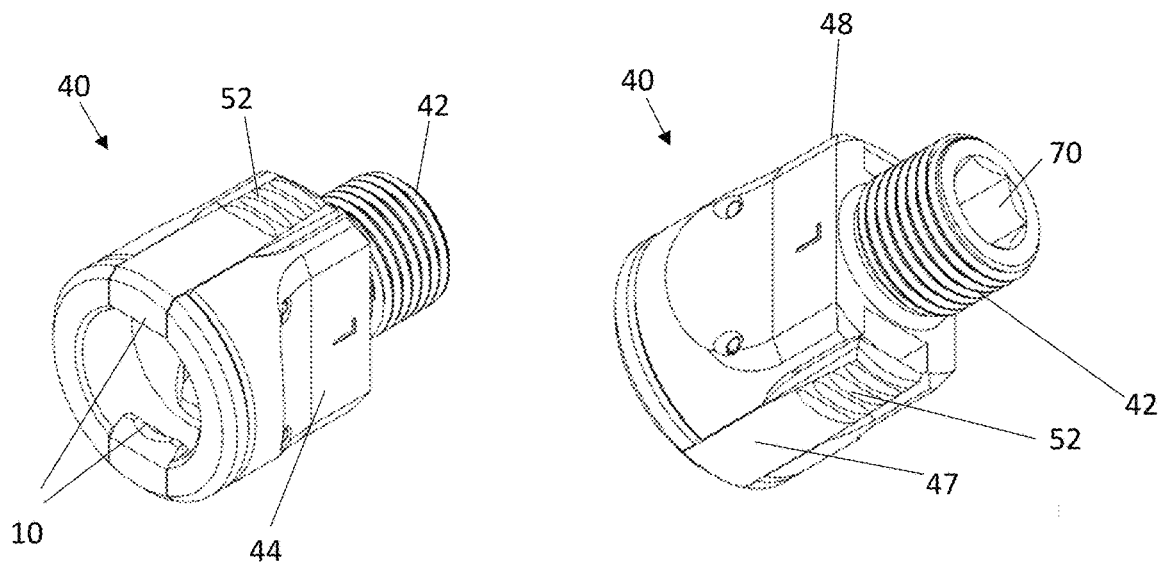
FIG. 9
FIG. 10

QUICK RELEASE PEDAL

CROSS-REFERENCE TO RELATED APPLICATIONS

This application is a Utility Patent application claiming priority to U.S. Provisional Patent Application Ser. No. 63/506,315, filed on Jun. 5, 2023, which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

BACKGROUND OF THE INVENTION

1) Field of the Invention

The invention relates to the field of bicycles and more particularly, to a quick release removable bicycle pedal for use on a bicycle.

2) Description of Related Art

In response to the need to store and move bicycles around more efficiently, in less space and without scratching one another, a category of quick-removable bicycle pedals has emerged to overcome the limitations of folding pedals. These quick-removable pedals consist of a latch that stays on the bike and a pedal body that is removed quickly and without tools. Unfortunately, these designs can sometimes come off while riding. The quick release category of bicycle pedals was created since pedals are a disruptive part of a bicycle when space is limited. When transporting a bike outside a car on a bike rack, pedals can interfere with the ability to place bikes close together, limiting the number of bicycles that can be carried safely. Pedals with cleats for mountain biking can scratch each other's frames or the paint on the car. Similarly, when transporting a bike lying down inside a car, bike pedals can be equally disruptive, grabbing floor carpeting, tearing seat material, or scratching any bikes laid on top. This interference, especially on folding bikes that can scratch themselves, was the impetus for the development of folding pedals, which partly address the problem of pedal interference while not reducing less than 50% in size and remaining a source of scratches. Folding pedals also have stability issues. The problem of pedal interference was not fully solved by folding pedals, leading to the development of quick-removable pedals, in which a small latch remains on the bike, leaving 80% or more of the pedal removed from the bicycle crank arm. This approach completely and quickly eliminates the pedal interference issue, while introducing a new problem where pedals sometimes come off the bike when they are not supposed to.

The origin of this issue is that the crank area of a bike is a busy place; Feet may go through a lot of random motions when riding a bike. Over the course of a bike ride, they may bounce, push, pull, slide in, side out, or rotate around the pedal shaft. Any quick-release pedal latches with a release mechanism based on pushing, pulling, sliding in, sliding out, or twisting in a rotational motion around the pedal shaft are at risk of accidental release during normal biking operation. Efforts to counteract the likelihood of accidental pedal release, often by combining different methods of release into a series of actions, also complexify the status. If one action is complete and the other is not, it is easily possible for a pedal to be half-latched before riding, with predictable consequences. For safe riding, it is essential that the rider know the difference between an unlatched and a latched pedal. With complex pedal latches, this can be achieved through increased user education. A better solution is to provide the user with visual feedback of the status and what it means such that all levels of bike riders can ride safely from the start. There are more than half a dozen different quick-release pedal latching systems on the market, and they can be categorized in six basic ways described herein. Most of these unlatching actions can be achieved with a foot, often easily and accidentally.

Push in: Push in embodiments involve a ring that slides in a parallel plane to the plane of the crank arm. Sometimes a simple push releases the pedal; other times, a semi stiff rubber coating requires a semi-stiff push with a toe or finger.

Push in and slide: The combination method involves two rings—one that moves in the crank arm plan and another that moves towards and away from the crank arm.

Push and turn: The combination method pushes against a spring and then twists around the pedal shaft.

Hose-mount: The method involves pushing, but along the pedal shaft instead of perpendicular (along the crank arm plane).

Pull out: The method involves a knob that sticks out and is difficult (but not impossible) to accidentally pull with a shoe. This knob also spins with every crank revolution and has a tendency to remove shoe instep soles in some cases.

Pinch: The pinch system uses two sliding clamps, similar to a cigar-cutter, to grab the end of the pedal shaft. This approach widens the base of the latch and provides no visible cues about the latching status.

BRIEF SUMMARY OF THE INVENTION

A first implementation of the invention solves the problem noted herein by counteracting this potentially dangerous situation, this unique design makes. unlatching while riding nearly impossible and makes latching status visibly self-evident.

The solution to a quick-removable pedal that does not unlatch accidentally is to focus on what the hands can do that feet cannot: pinching. A pinch-based system involves pressing simultaneously on both sides of a latch to release the pedal shaft. Pressing on one side is not sufficient, as simple pushing can easily be a foot action. The solution to the final problem of unknown latching status is to make the latching point clearly visible to the user.

The invention uses pedal latching that can be achieved only with hands, not feet, making the pedal safer for use in mountain biking and other activities where accidental release can be problematic. In addition, the latching status of the pedal is immediately self-evident, leading to fewer cases of a rider unsafely embarking on a ride with an incompletely installed pedal.

The instant invention in one form is directed to a quick release bicycle pedal assembly including a bicycle pedal and a pedal spindle rotatably securable to a bicycle pedal. The bicycle pedal has an elongated cavity and a pedal bearing disposed in the elongated cavity and the pedal spindle has a circumscribed groove disposed toward a shaft first end and a shaft threaded end opposite the shaft first end, wherein the shaft threaded end is securable to the pedal bearing and allows the pedal to spin around the pedal spindle when the shaft threaded end is secured to the pedal bearing. The quick release bicycle pedal assembly includes a pedal adapter including a latch body having male adapter threads disposed on a first body latch end for securing the pedal adapter to a bicycle crank arm, an opening extending through the latch body, the opening aligned axially with the male adapter threads, a first lever disposed pivotally on the latch body and a second lever disposed pivotally on the latch body, the second lever on an opposite side of the latch body than the first lever. The quick release bicycle pedal assembly includes a lip disposed on each of the first and second lever, the lip extending inwardly toward a central axis of the latch body and a recessed finger activator disposed opposite the lip. The lip of each of the first and second lever is engageable with the circumscribed groove wherein the pedal is secured to the bicycle crank arm when the first and second lever are in a locked position and the pedal is removable from the bicycle crank arm when the first and second lever are in the release position. The first and second levers are biased in the locked position and require pressure on each of the first and second lever recessed finger activators simultaneously to allow attachment of the pedal to the bicycle crank arm or to allow release of the pedal from the bicycle crank arm. The quick release bicycle pedal assembly may include a first spring disposed between first lever and the latch body, the first spring for biasing the first lever in the locked position and a second spring disposed between second lever and the latch body, the second spring for biasing the second lever in the locked position. The opening of the latch body may include a hexagonal inner surface for engagement with a hexagonal tool allow attachment of the pedal adapter to the bicycle crank arm or to allow removal of the pedal adapter from the bicycle crank arm. The lever may be recessed for preventing accidental activation of the quick release pedal assembly. The pedal adapter may be a low-profile adapter which maintains a low Q-Factor of the bicycle. The finger activator may be a recessed finger activator. The quick release bicycle pedal assembly may include a circumferential ring extending radially from the pedal spindle adjacent the circumscribed groove between the one end of the pedal spindle and the circumscribed groove. The lip may include an inclined surface where the lip meets the circumferential ring when engaging the pedal adapter with the pedal spindle, the inclined surface for automatically activating the first lever and the second lever during installation of the pedal on to the crank arm without a user having to depress the first lever and the second lever. The finger activator may be recessed below a surface on the pedal adapter for preventing accidental activation of the first lever and the second lever.

Another aspect is directed to pedal spindle for use with a quick release bicycle pedal assembly. The pedal spindle includes a shaft for connection to a removable bicycle pedal, a first shaft end and a second shaft end opposite the first shaft end and male threads disposed on the second shaft end for engagement within a pedal cavity of the removable bicycle pedal. The pedal spindle includes a shaft ring extending radially from the shaft, the shaft ring including an inclined ring surface and a squared surface opposite the inclined surface, the shaft ring for engagement of a first lip of a first lever on a pedal adapter and of a second lip of a second lever on the pedal adapter. The pedal adapter is removably attachable to the pedal spindle by depressing the first and second lever. The lip of each of the first and second lever is engageable with the shaft ring. The pedal is secured to the bicycle crank arm when the lever is in a locked position and the pedal is removable from the bicycle crank arm when the lever is in the release position, the pedal adapter including a latch body having male threads disposed on a first body latch end, the male threads for attaching the pedal to a bicycle crank arm, an opening extending through the latch body, the opening aligned axially with the male treads a first lever disposed pivotally on the latch body and a second lever disposed pivotally on the latch body, the second lever on an opposite side of the latch body than the first lever, a lip disposed on each of the first and second lever. The first and second levers are biased in the locked position and require pressure on each of the first and second lever recessed finger activators simultaneously to allow attachment of the pedal to the bicycle crank arm or to allow release of the pedal from the bicycle crank arm.

These and other objects, features, and advantages of the present invention will become more readily apparent from the attached drawings and the detailed description of the preferred embodiments, which follow.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 8 is a side cross-sectional view showing an enlarged portion of the spindle with the pedal adapter attached and in the locked position viewed from section lines 5-5 shown in FIG. 1;

FIG. 9 is a perspective view of the latching mechanism showing the opening for engagement of the pedal spindle;

FIG. 10 is a perspective view of the latching mechanism showing how the threaded section screws into the bicycle's crank arm;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
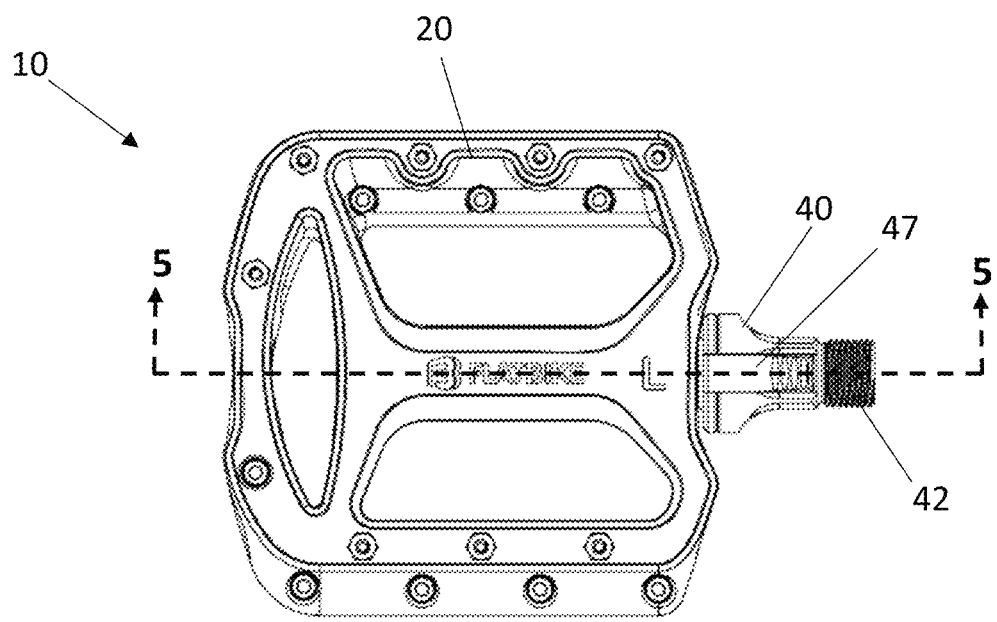
FIG. 1 is a top plan view of the bicycle pedal quick release system with the pedal and shaft attached to the quick release latch.
Figure 2:
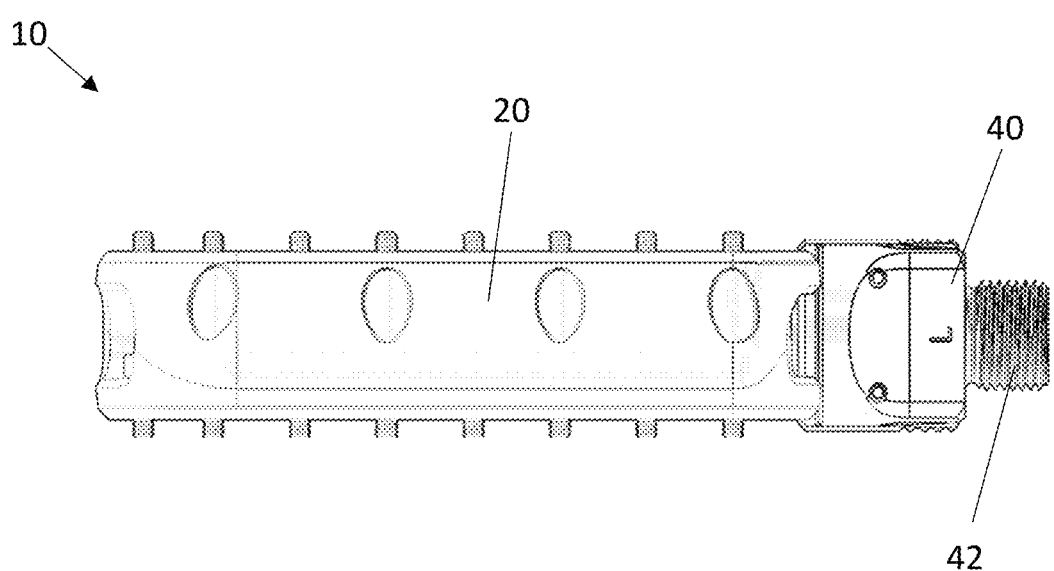
FIG. 2 is a side elevational view of the bicycle pedal quick release system with the pedal and shaft attached to the quick release latch.
Figure 3:
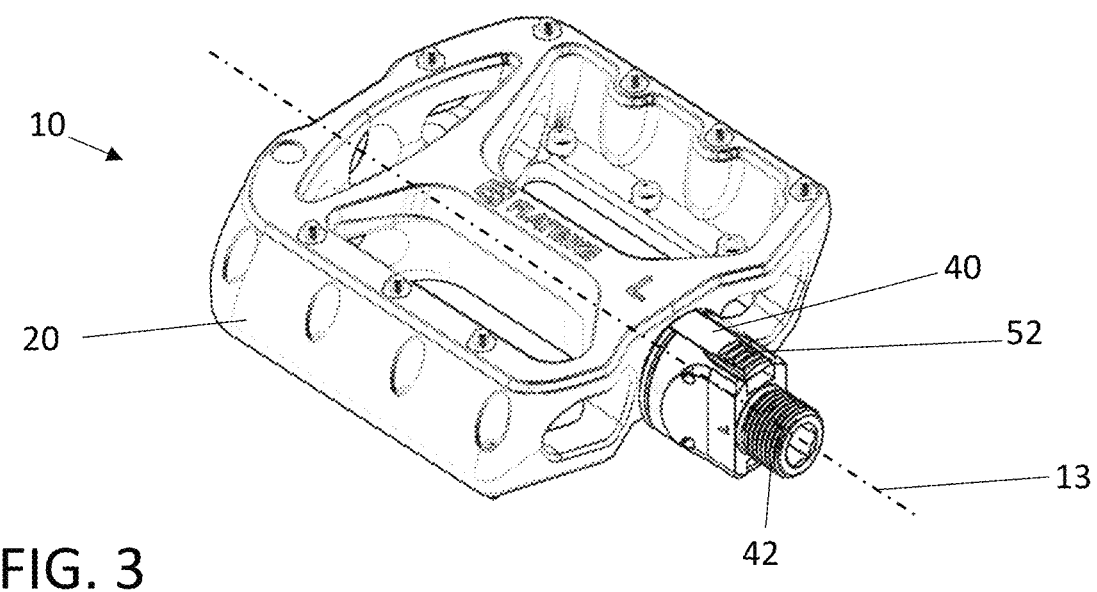
FIG. 3 is a perspective view of the bicycle pedal quick release system with the pedal and shaft attached to the quick release latch.
Figure 4:
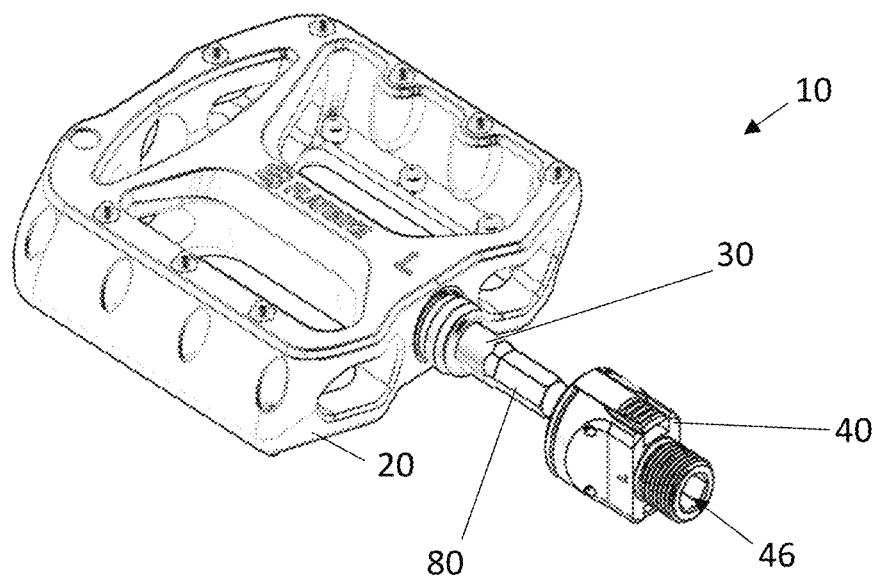
FIG. 4 is a perspective view of the bicycle pedal quick release system with the pedal and shaft removed from the quick release latch.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

A bicycle pedal refers to a component of a bicycle that the rider pushes with their foot to propel the bicycle. It is typically a flat surface that provides a platform for the foot, and is attached to a spindle that is secured to the bicycle crank arm.

A pedal spindle refers to a rod or shaft to which the bicycle pedal is attached. The spindle is rotatably securable to the bicycle pedal, allowing the pedal to spin around the spindle. The spindle features a circumscribed groove adjacent one end and a threaded knob extending from the opposite end, which is securable to a pedal bearing located within an elongated cavity in the bicycle pedal.

The pedal adapter refers to a component designed for attachment to the pedal spindle. The pedal adapter includes a latch body with male threads on one end for attaching the pedal to a bicycle crank arm. The latch body also features an opening aligned axially with the male threads, and two levers pivotally disposed on the latch body.

The lip refers to a protrusion or extension on each of the first and second levers of the pedal adapter. The lip extends inwardly towards the central axis of the latch body and is engageable with the circumscribed groove on the pedal spindle.

The recessed finger activator refers to a component located opposite the lip on each of the first and second levers. The recessed finger activator is designed to receive pressure from a user's finger to allow attachment or release of the pedal from the bicycle crank arm.

The first and second springs refer to components disposed between the first and second levers, respectively, and the latch body. These springs are designed to bias the levers in a locked position, securing the pedal to the bicycle crank arm.

The steel shaft refers to the material composition of the pedal spindle. The pedal spindle is made of steel, a strong and durable material suitable for the mechanical stresses experienced during cycling.

The hexagonal inner surface refers to the shape of the inner surface of the opening in the latch body of the pedal adapter. This hexagonal shape is designed for engagement with a hexagonal tool, allowing for the attachment or removal of the pedal adapter from the bicycle crank arm.

Figure 5:
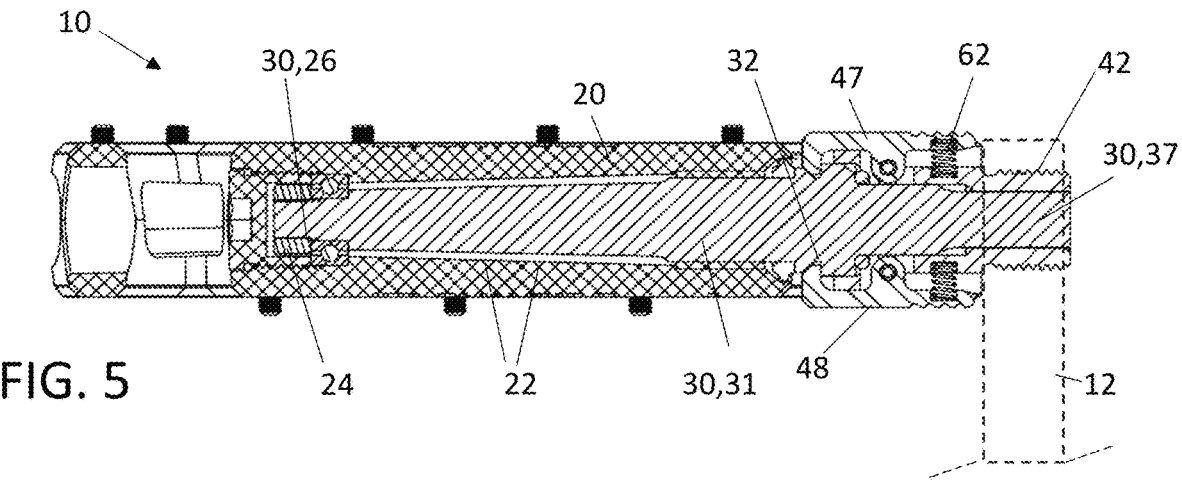
FIG. 5 is side cross-sectional view of the quick release mechanism in the engaged state viewed from section lines 5-5 shown in FIG. 1.
Figure 6:
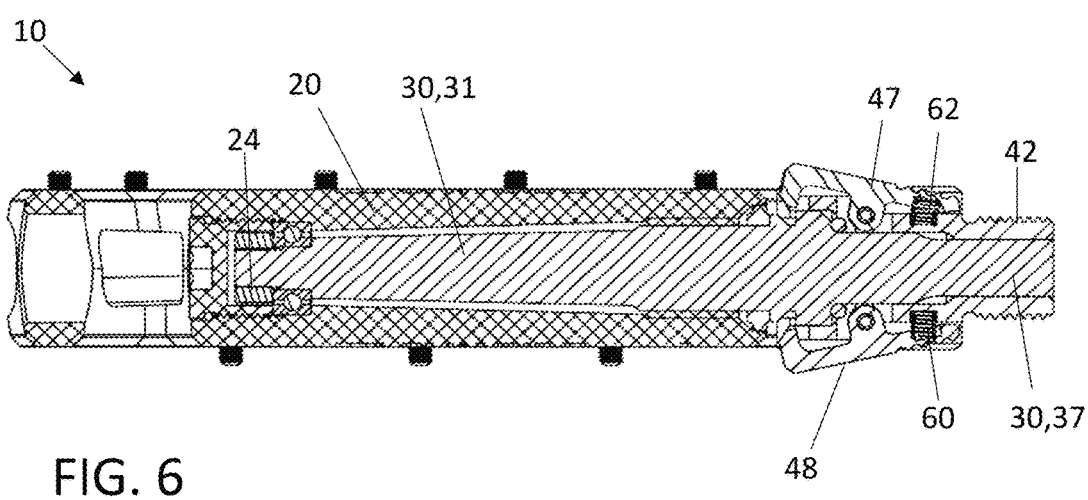
FIG. 6 is side cross-sectional view of the quick release mechanism in the released state viewed from section lines 5-5 shown in FIG. 1.

One aspect of the quick release bicycle pedal assembly 10 as shown in FIGS. 1-4 includes a bicycle pedal 20 and a pedal spindle 30 rotatably securable to a bicycle pedal 20. As shown in FIGS. 5 and 6, the bicycle pedal has an elongated cavity 22 and a pedal bearing 24 disposed in the elongated cavity 22. The pedal spindle 30 includes a circumscribed groove 32 proximate a shaft first end 37 and a shaft threaded end 38 opposite the shaft first end, wherein the threaded knob is securable to internal threads 26 on the pedal bearing 24 and allows the pedal 20 to spin around the pedal spindle 30 when the shaft threaded end 38 is secured to the pedal bearing 24. The quick release bicycle pedal assembly 10 includes a pedal adapter 40 shown in FIGS. 8-10. The pedal adapter 40 is for attachment of the pedal spindle 30 to a bicycle crank arm. The pedal adapter 40 includes a latch body 44 having male adapter threads 42 disposed on a first body latch end, the male adapter threads 42 for attaching the pedal adapter 40 to a bicycle crank arm 12 and an opening extending through the latch body 46, the opening 46 aligned axially with the male adapter treads 42. The pedal adapter 40 includes a first lever 47 disposed pivotally on the latch body 44 and a second lever 48 disposed pivotally on the latch body 44, the second lever 48 on an opposite side of the latch body 44 than the first lever 47. Each lever 47,48 includes a lip 54 extending inwardly toward a central axis 13 of the latch body 44 and a recessed finger activator 52 disposed opposite the lip 54, wherein the lip 54 of each of the first and second lever is engageable with the circumscribed groove 52 wherein the pedal 20 is secured to the bicycle crank arm 12 when both levers 47,48 are in a locked position and the pedal 20 is removable from the bicycle crank arm 12 when both levers 47,48 are in the release position. The first and second levers 47,48 are biased in the locked position and require pressure on each of the first and second lever recessed finger activators 52 simultaneously to allow attachment of the pedal 20 to the bicycle crank arm 12 or to allow release of the pedal 20 from the bicycle crank arm 12. The quick release bicycle pedal assembly 10 includes a first spring 60 disposed between first lever 48 and the latch body 44, the first spring 60 for biasing the first lever 47 in the locked position and a second spring 62 disposed between second lever 38 and the latch body 44, the second spring 62 for biasing the second lever 48 in the locked position. The opening 46 of the latch body may include a hexagonal inner surface 70 for engagement with a hexagonal tool allow attachment of the pedal adapter 40 to the bicycle crank arm 12 or to allow removal of the pedal adapter 40 from the bicycle crank arm 12. The hexagonal inner surface 70 may also accommodate the shaft first end 37 of the pedal spindle 30 when the shaft first end 37 has a hexagonal profile. The pedal spindle may be a steel shaft. The lever may recessed for preventing accidental activation of the quick release pedal assembly. The pedal adapter may be a low-profile adapter which maintains a Q-Factor of the bicycle. The finger activator 52 may be a recessed finger activator. The quick release bicycle pedal assembly 10 may include a circumferential ring 33 extending radially from the pedal spindle 30 adjacent the circumscribed groove 32 between the one end of the pedal spindle and the circumscribed groove 32. The lip 53, 54 may include an inclined surface where the lip 53,54 meets the circumferential ring 33 when engaging the pedal adapter 40 with the pedal spindle 30, the inclined surface 56 for automatically activating the first lever 47 and the second lever 48 during installation of the pedal 20 on to the crank arm 12 without a user having to depress the first lever 47 and the second lever 48. The finger activator 52 is recessed below a surface on the pedal adapter 40 for preventing accidental activation of the first lever 47 and the second lever 48. The second spindle end may extend through substantially all of the pedal adapter opening for providing support for the pedal adapter.

Figure 7:
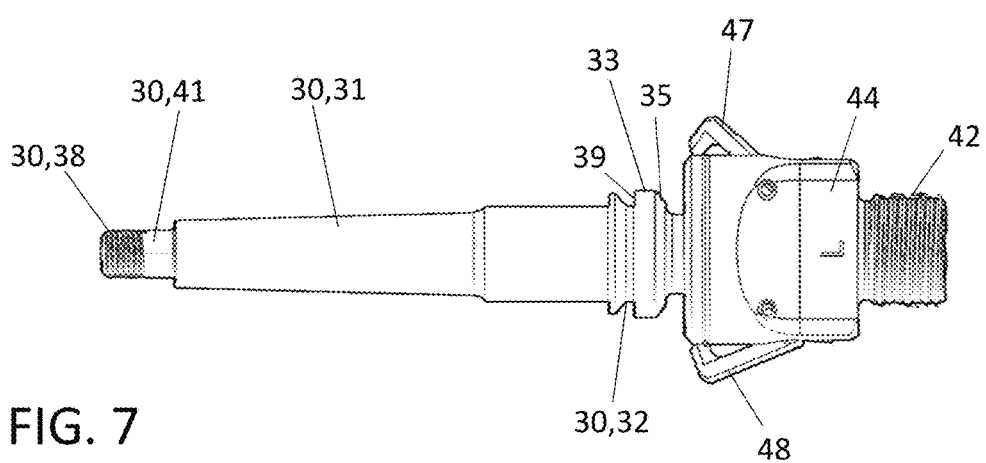
FIG. 7 is a side view showing the spindle and pedal adapter with the pedal removed for clarity.
Figure 11:
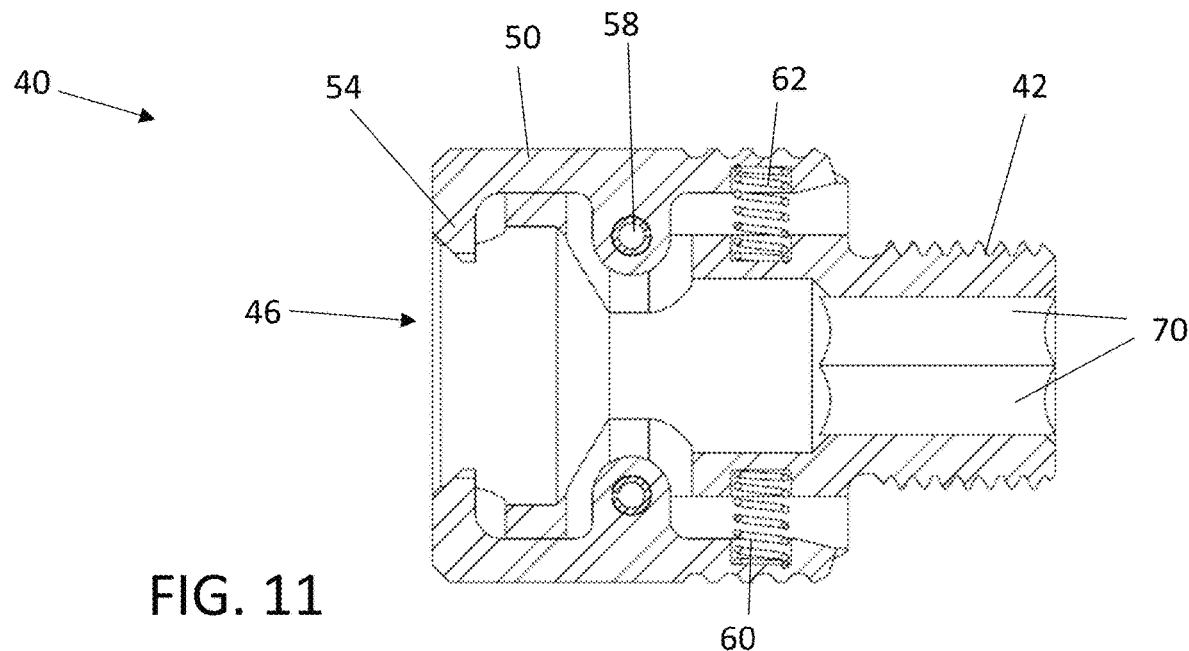
FIG. 11 is a side cross-sectional view of the pedal adapter in the locked position viewed from section lines 5-5 shown in FIG. 1.
Figure 12:
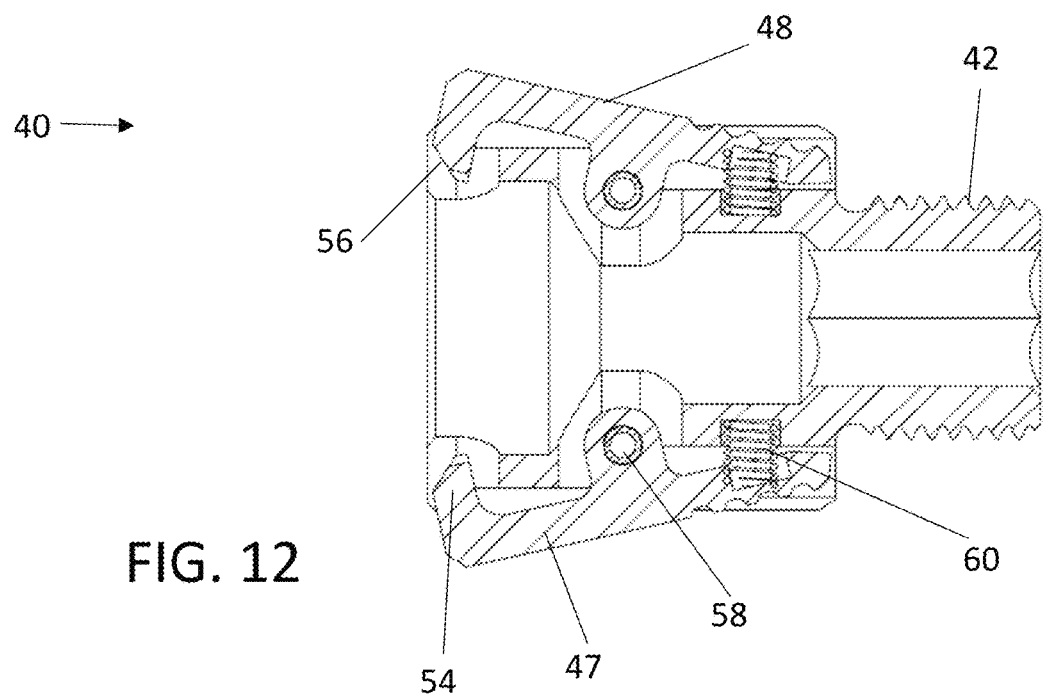
FIG. 12 is a side cross-sectional view of the pedal adapter in the release position viewed from section lines 5-5 shown in FIG. 1.

Another aspect of the quick release bicycle pedal assembly is a pedal spindle 30 for use with the quick release bicycle pedal assembly as shown in FIGS. 5-7 and the partial view of FIG. 8. The pedal spindle 30 includes a shaft 31 for connection to a removable bicycle pedal 20, a first shaft end 37 and a second shaft end 41 opposite the first shaft end 37. The pedal spindle 30 includes male threads 38 disposed on the second shaft end for engagement within a pedal cavity 22 of the removable bicycle pedal. A shaft ring 33 extends radially from the shaft 31. The shaft ring 33 includes an inclined ring surface 35 and a squared surface 39 opposite the inclined surface. The shaft ring 33 is for engagement of a first lip 53 of a first lever 47 on a pedal adapter 40 and of a second lip 54 of a second lever 48 on the pedal adapter 40 wherein the pedal adapter 40 is removably attachable to the pedal spindle 30 by depressing the first lever 47 and second lever 48, simultaneously. The lip 53,54 of each of the first lever 47 and second lever 48 is engageable with the shaft ring 33 wherein the pedal 20 is secured to the bicycle crank arm 12 when the lever is in a locked position and the pedal is removable from the bicycle crank arm when the lever is in the release position. The pedal adapter 40 shown in FIGS. 9-12 includes a latch body 44 having male threads 42 disposed on a first body latch end, the male threads 42 for attaching the pedal 20 to a bicycle crank arm 12. The pedal adapter 40 includes an opening 46 extending through the latch body, the opening aligned axially with the male treads 42. A first lever 47 is disposed pivotally on the latch body 44 and a second lever 48 disposed pivotally on the latch body 44. The second lever 48 is disposed on an opposite side of the latch body 44 than the first lever 47. A first lip 53 and a second lip 54 are disposed on the first lever 47 and second lever 48, respectively. The first and second levers are biased in the locked position and require pressure on each of the first and second lever recessed finger activators 52 simultaneously to allow attachment of the pedal 20 to the bicycle crank arm 12 or to allow release of the pedal from the bicycle crank arm. The pedal spindle 30 may be a steel shaft.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A quick release bicycle pedal assembly comprising:
   a bicycle pedal;
   a pedal spindle rotatably securable to the bicycle pedal, the bicycle pedal having an elongated cavity and a pedal bearing disposed in the elongated cavity, the pedal spindle having a circumscribed groove disposed toward a shaft first end and a shaft threaded end opposite the shaft first end, wherein the shaft threaded end is securable to the pedal bearing and allows the pedal to spin around the pedal spindle when the shaft threaded end is secured to the pedal bearing;
   a pedal adapter including a latch body having male adapter threads disposed on a first body latch end for securing the pedal adapter to a bicycle crank arm, an opening extending through the latch body, the opening aligned axially with the male adapter threads, a first lever disposed pivotally on the latch body and a second lever disposed pivotally on the latch body, the first and second levers are on opposite sides of the latch body; and a lip disposed on each of the first and second lever, the lip extending inwardly toward a central axis of the latch body and a recessed finger activator disposed opposite the lip, wherein the lip of each of the first and second lever is engageable with the circumscribed groove wherein the pedal is secured to the bicycle crank arm when the first and second lever are in a locked position and the pedal is removable from the bicycle crank arm when the first and second lever are in a release position; and wherein the first and second levers are biased in the locked position and require pressure on each of the first and second lever recessed finger activators simultaneously to allow attachment of the pedal to the bicycle crank arm or to allow release of the pedal from the bicycle crank arm.

2. The quick release bicycle pedal assembly of claim 1 including a first spring disposed between first lever and the latch body, the first spring for biasing the first lever in the locked position and a second spring disposed between second lever and the latch body, the second spring for biasing the second lever in the locked position.

3. The quick release bicycle pedal assembly of claim 1 wherein the opening of the latch body includes a hexagonal inner surface for engagement with a hexagonal tool allow attachment of the pedal adapter to the bicycle crank arm or to allow removal of the pedal adapter from the bicycle crank arm wherein the hexagonal inner surface also protects the pedal spindle from wear caused by spinning during usage in the quick release pedal assembly.

4. The quick release bicycle pedal assembly of claim 1, wherein the pedal spindle is a steel shaft.

5. The quick release bicycle pedal assembly of claim 1 wherein the lever is recessed for preventing accidental activation of the quick release pedal assembly.

6. The quick release bicycle pedal assembly of claim 1 wherein the pedal adapter is a low-profile adapter which maintains a reduced Q-Factor of the bicycle.

7. The quick release bicycle pedal assembly of claim 1, wherein the finger activator is a recessed finger activator.

8. The quick release bicycle pedal assembly of claim 1 including a circumferential ring extending radially from the pedal spindle adjacent the circumscribed groove between the one end of the pedal spindle and the circumscribed groove.

9. The quick release bicycle pedal assembly of claim 8 wherein the lip includes an inclined surface where the lip meets the circumferential ring when engaging the pedal adapter with the pedal spindle, the inclined surface for automatically activating the first lever and the second lever during installation of the pedal on to the crank arm without a user having to depress the first lever and the second lever.

10. The quick release bicycle pedal assembly of claim 1 wherein the finger activator is recessed below a surface on the pedal adapter for preventing accidental activation of the first lever and the second lever.

11. The quick release bicycle pedal assembly of claim 1 wherein the second spindle end extends through substantially all of the pedal adapter opening for providing support for the pedal adapter.

12. A quick release bicycle pedal assembly comprising:
a bicycle pedal having a pedal spindle rotatably secured to the bicycle pedal, the pedal spindle having a circumscribed groove adjacent an exposed end;

a pedal adapter for rotatably attaching the bicycle pedal to a bicycle crank arm, the pedal adapter including a latch body having a first body end and as second body end opposite the first body end, the first body end including male threads, the male threads for attaching the pedal adapter to the bicycle crank arm, an opening extending through between the first body end and the second body end, the opening aligned axially with the male treads, a first lever disposed pivotally on the latch body, a second lever disposed pivotally on the latch body, the first and second levers are on opposite sides of the latch body, a lip disposed on each of the first and second lever, the lip extending inwardly toward a central axis of the latch body and a finger activator disposed opposite the lip, wherein the lip of each of the first and second lever is engageable with the circumscribed groove wherein the pedal is secured to the bicycle crank arm when the lever is in a locked position and the pedal is removable from the bicycle crank arm when the lever is in a release position; and wherein the first and second levers are biased in the locked position and require pressure on each of the first and second lever finger activators simultaneously to allow attachment of the pedal to the bicycle crank arm or to allow release of the pedal from the bicycle crank arm;

wherein the pedal spindle is a steel shaft.

13. The quick release bicycle pedal assembly of claim 12 including a first spring disposed between first lever and the latch body, the first spring for biasing the first lever in the locked position and a second spring disposed between second lever and the latch body, the second spring for biasing the second lever in the locked position.

14. The quick release bicycle pedal assembly of claim 12, wherein the finger activator is a recessed finger activator for preventing accidental activation of the pedal adapter.

15. The quick release bicycle pedal assembly of claim 12, wherein the pedal adapter is made of a durable material resistant to corrosion.

16. The quick release bicycle pedal assembly of claim 12, wherein a hexagonal inner surface of the latch body is designed to engage with a specific hexagonal tool for enhanced security.

17. A pedal spindle for use with a quick release bicycle pedal assembly, the pedal spindle comprising:
a shaft for connection to a removable bicycle pedal;
a first shaft end and a second shaft end opposite the first shaft end;
male threads disposed on the second shaft end for engagement within a pedal cavity of the removable bicycle pedal;
a shaft ring extending radially from the shaft, the shaft ring including an inclined ring surface and a squared surface opposite the inclined ring surface, the shaft ring for engagement of a first lip of a first lever on a pedal adapter and of a second lip of a second lever on the pedal adapter;
wherein the pedal adapter is removably attachable to the pedal spindle by depressing the first and second lever;
wherein the lip of each of the first and second lever is engageable with the shaft ring
wherein the pedal is secured to the bicycle crank arm when the lever is in a locked position and the pedal is removable from the bicycle crank arm when the lever is in a release position, the pedal adapter including a latch body having male threads disposed on a first body latch end, the male threads for attaching the pedal to a bicycle crank arm, an opening extending through the latch body, the opening aligned axially with the male treads the first lever disposed pivotally on the latch body and the second lever disposed pivotally on the latch body, the first and second levers are on opposite sides of the latch body, a lip disposed on each of the first and second lever;

wherein the first and second levers are biased in the locked position and require pressure on each of the first and second lever recessed finger activators simultaneously to allow attachment of the pedal to the bicycle crank arm or to allow release of the pedal from the bicycle crank arm.

18. The pedal spindle of claim 17, wherein the shaft is a steel shaft.

\* \* \* \* \*